(12) United States Patent
Forster

(10) Patent No.: US 10,373,045 B2
(45) Date of Patent: Aug. 6, 2019

(54) COUPLING OF RFID STRAPS TO ANTENNAE USING A COMBINATION OF MAGNETIC AND ELECTRIC FIELDS

(71) Applicant: Avery Dennison Retail Information Services, LLC, Westborough, MA (US)

(72) Inventor: Ian J. Forster, Chelmsford (GB)

(73) Assignee: AVERY DENNISON RETAIL INFORMATION SERVICES, LLC, Mentor, OH (US)

( * ) Notice: Subject to any disclaimer, the term of this patent is extended or adjusted under 35 U.S.C. 154(b) by 0 days.

(21) Appl. No.: 15/366,788

(22) Filed: Dec. 1, 2016

(65) Prior Publication Data
US 2018/0157955 A1    Jun. 7, 2018

(51) Int. Cl.
| G06K 7/08 | (2006.01) |
| G06K 19/06 | (2006.01) |
| G06K 19/08 | (2006.01) |
| G06K 19/07 | (2006.01) |
| G06K 19/077 | (2006.01) |
| H01Q 1/22 | (2006.01) |
| H01Q 9/16 | (2006.01) |

(52) U.S. Cl.
CPC ....... G06K 19/08 (2013.01); G06K 19/06187 (2013.01); G06K 19/0723 (2013.01); G06K 19/07786 (2013.01); H01Q 1/2208 (2013.01); H01Q 9/16 (2013.01)

(58) Field of Classification Search
USPC ................................................. 235/451, 492
See application file for complete search history.

(56) References Cited

U.S. PATENT DOCUMENTS 7,500,610 B1 * 3/2009 Hadley ............ G06K 19/07718
235/451
7,551,141 B1    6/2009 Hadley et al.
(Continued)

FOREIGN PATENT DOCUMENTS

EP    2810222    12/2014
WO    2016073327    5/2016

OTHER PUBLICATIONS

International Search Report and Written Opinion of ISA/EPO prepared for PCT/US2017/063676 dated Feb. 16, 2018.

*Primary Examiner* — Tuyen K Vo
(74) *Attorney, Agent, or Firm* — Avery Dennison Retail Information Service, LLC (57) ABSTRACT

An RFID device includes an antenna and an RFID strap. The RFID strap is coupled to the antenna by a combination of magnetic and electric fields. The RFID strap includes an RFID chip and a strap conductor coupling the RFID chip to the antenna. The strap conductor has a loop section positioned generally adjacent to the antenna to magnetically couple the RFID strap to the antenna. The strap conductor also has an extension section overlapping and crossing the antenna to electrically couple the RFID strap to the antenna. By adjusting the size of the RFID strap, the configuration of the RFID strap, the degree of overlap between the extension section and the antenna, and/or the angular orientation of the RFID strap with respect to the antenna, the impedance transformation between the RFID chip and the antenna may be varied to better match the RFID chip and the antenna.

18 Claims, 6 Drawing Sheets

(56) References Cited

U.S. PATENT DOCUMENTS

| | | | |
|---|---|---|---|
| 2005/0093677 A1* | 5/2005 | Forster | G06K 19/07749 340/10.1 |
| 2005/0212673 A1* | 9/2005 | Forster | G06K 7/0008 340/572.7 |
| 2005/0282495 A1* | 12/2005 | Forster | G06K 7/0095 455/41.2 |
| 2006/0043198 A1 | 3/2006 | Forster | |
| 2006/0044769 A1* | 3/2006 | Forster | G06K 19/07749 361/760 |
| 2006/0055542 A1 | 3/2006 | Forster et al. | |
| 2007/0164414 A1 | 7/2007 | Dokai et al. | |
| 2007/0210924 A1* | 9/2007 | Arnold | B31D 1/021 340/572.8 |
| 2008/0036673 A1 | 2/2008 | Yamagajo et al. | |
| 2008/0311849 A1 | 12/2008 | Washiro | |
| 2009/0079568 A1 | 3/2009 | Forster et al. | |
| 2009/0109102 A1 | 4/2009 | Dokai et al. | |
| 2009/0146821 A1 | 6/2009 | Kato et al. | |
| 2009/0201157 A1 | 8/2009 | Forster | |
| 2009/0224061 A1 | 9/2009 | Kato et al. | |
| 2010/0126000 A1* | 5/2010 | Forster | G06K 19/07718 29/601 |
| 2011/0155813 A1* | 6/2011 | Forster | G06K 19/07749 235/492 |
| 2011/0284641 A1 | 11/2011 | Yang | |
| 2011/0290891 A1* | 12/2011 | Chen | G06K 19/07749 235/488 |
| 2012/0006904 A1 | 1/2012 | Kato et al. | |
| 2012/0038461 A1* | 2/2012 | Forster | G06K 19/07749 340/10.1 |
| 2012/0223149 A1 | 9/2012 | Kato | |
| 2012/0273577 A1 | 11/2012 | Kim et al. | |
| 2013/0026237 A1 | 1/2013 | Stobbe | |
| 2014/0027520 A1 | 1/2014 | Kato | |
| 2014/0191045 A1 | 7/2014 | Forster | |
| 2015/0170018 A1 | 6/2015 | Loussert et al. | |
| 2015/0235063 A1 | 8/2015 | Loussert | |

* cited by examiner

COUPLING OF RFID STRAPS TO ANTENNAE USING A COMBINATION OF MAGNETIC AND ELECTRIC FIELDS

BACKGROUND

Field of the Disclosure

The present subject matter relates to radio frequency identification ("RFID") devices. More particularly, the present subject matter relates to RFID devices in which an RFID strap is coupled to an associated antenna using a combination of magnetic and electric fields.

Description of Related Art

RFID devices are widely used to associate an object with an identification code. Such devices incorporate an RFID strap that is coupled to an antenna. The RFID strap includes an RFID chip that is programmed with and/or configured to be programmed to include a variety of information, such as an identity of the item to which the RFID device is associated (e.g., a piece of merchandise in a retail setting). The antenna allows the RFID device to communicate with an RFID reader, receiving signals from and/or transmitting signals to the RFID reader.

The RFID strap and antenna may be coupled together in a variety of ways. For example, according to one conventional design, the RFID strap and antenna of an RFID device are coupled via a conductive connection. In another conventional design, the RFID strap and antenna of an RFID device are coupled via an electric field capacitive connection. In yet another conventional design, the RFID strap and antenna of an RFID device are coupled via a magnetic induction field.

Each of the known approaches to coupling the RFID strap and antenna has its own advantages, but it would be advantageous to provide MD devices incorporating the benefits of multiple coupling technologies.

SUMMARY

There are several aspects of the present subject matter which may be embodied separately or together in the devices and systems described and claimed below. These aspects may be employed alone or in combination with other aspects of the subject matter described herein, and the description of these aspects together is not intended to preclude the use of these aspects separately or the claiming of such aspects separately or in different combinations as set forth in the claims appended hereto.

In one aspect, an RFID device includes an antenna and an RFID strap. The RFID strap is coupled to the antenna by a combination of magnetic and electric fields.

In another aspect, a method is provided for coupling an RFID strap of an RFID device to an antenna of the RFID device. The method includes coupling the RFID strap to the antenna by a magnetic field and by an electric field.

DESCRIPTION OF THE ILLUSTRATED EMBODIMENTS

As required, detailed embodiments of the present invention are disclosed herein; however, it is to be understood that the disclosed embodiments are merely exemplary of the invention, which may be embodied in various forms. Therefore, specific details disclosed herein are not to be interpreted as limiting, but merely as a basis for the claims and as a representative basis for teaching one skilled in the art to variously employ the present invention in virtually any appropriate manner.

Figure 1:
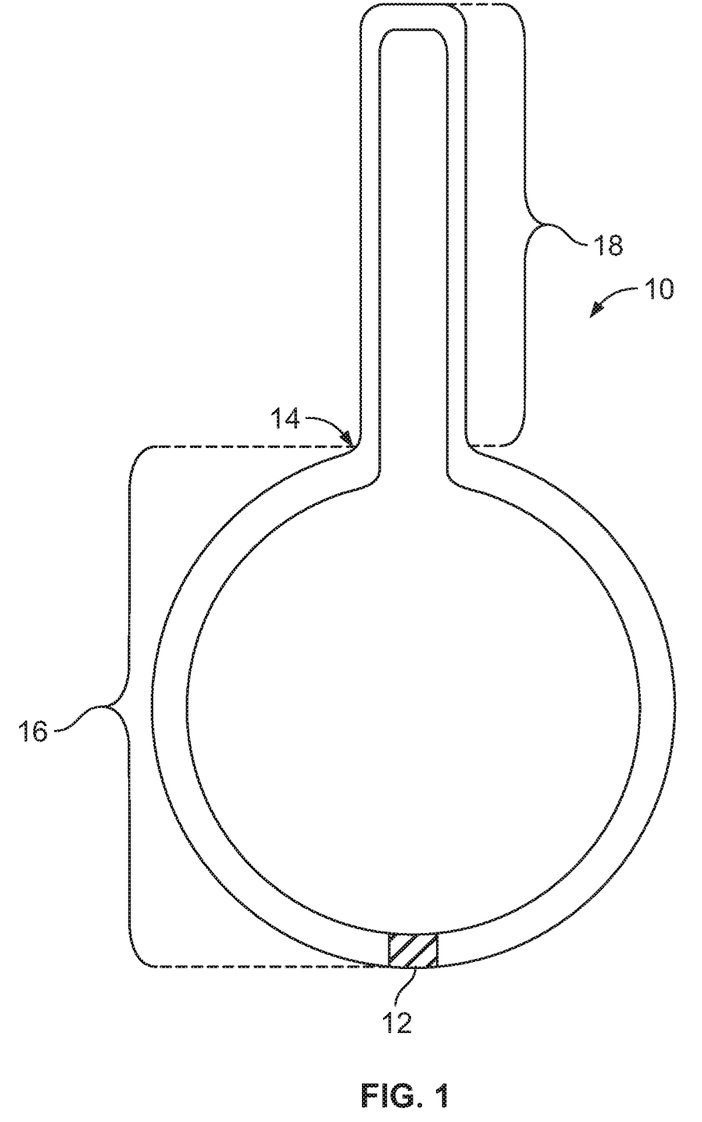
FIG. 1 is a top plan view of a mixed mode RFID strap according to an aspect of the present disclosure, which may be coupled to an associated antenna via a combination of electric and magnetic fields.

FIG. 1 shows an exemplary RFID strap, generally designated at 10, (which may be referred to as a mixed mode strap) of an RFID device according to an aspect of the present disclosure, which allows for coupling between the RFID strap 10 and an antenna of the RFID device by a combination of magnetic and electric fields. The illustrated RFID strap 10 includes an RFID chip 12 (which may be provided according to either a conventional design or a novel design) and a strap conductor, generally designated at 14, that couples the RFID chip 12 to the antenna of the associated RFID device.

The strap conductor 14 is formed of an electrically conductive material and defines two portions or sections—a loop section 16 and an extension section 18. As will be described in greater detail, the loop section 16 and the extension section 18 may be variously configured without departing from the scope of the present disclosure, but in the embodiment of FIG. 1, the loop section 16 is generally circular, while the extension section 18 is generally rectangular.

The loop section 16 is configured to be positioned generally adjacent to the associate antenna, with the extension section 18 contacting the antenna, shown in FIGS. 2A, 3A, and 4A-6B as overlapping and crossing the antenna, which will be discussed in greater detail herein. As used herein, the term "overlapping" is not limited to a configuration in which the extension section 18 is physically above the antenna (e.g., with the antenna sandwiched between the extension section 18 and a substrate on which the antenna is mounted) at the locations where the two cross, but also includes a configuration in which the extension section 18 is positioned physically below the antenna (for example with the extension section 18 sandwiched between the antenna and a substrate on which the strap conductor 14 is mounted) at the locations where the two cross. Inasmuch as the extension section 18 may cross the antenna at multiple locations, it is specifically contemplated that the extension section 18 may be positioned physically above the antenna at all locations, at none of the locations, and at at least one location, but not at all of the locations. In any of these possible configurations, the extension section 18 is considered to overlap and cross the antenna at each location.

The loop section 16 of the RFID strap 10 couples the RFID chip 12 to an associated antenna primarily by a magnetic field, with the coupling strength being determined by the distance and relative angle between the RFID chip 12 and the location or locations at which the strap conductor 14 contacts the antenna. The extension section 18 of the RFID strap 10 couples the RFID chip 12 to the antenna primarily by capacitance (i.e., electric field) at the location or locations at which it is in proximity to the antenna. Thus, an RFID strap 10 having a strap conductor 14 incorporating a loop section 16 and an extension section 18 will be coupled to the associated antenna by a combination of electric and magnetic fields. By such a configuration, an RFID device incorporating such an RFID strap 10 will have the benefits of both electric field and magnetic field coupling. Significantly, coupling the RFID chip 12 to the associated antenna by a combination of electric and magnetic fields (the characteristics of which may be varied and controlled when designing the RFID device) allows for improved impedance matching of the RFID chip 12 and the antenna compared to what is possible with only one coupling approach (e.g., only an electric field or only a magnetic field).

Figure 2A:
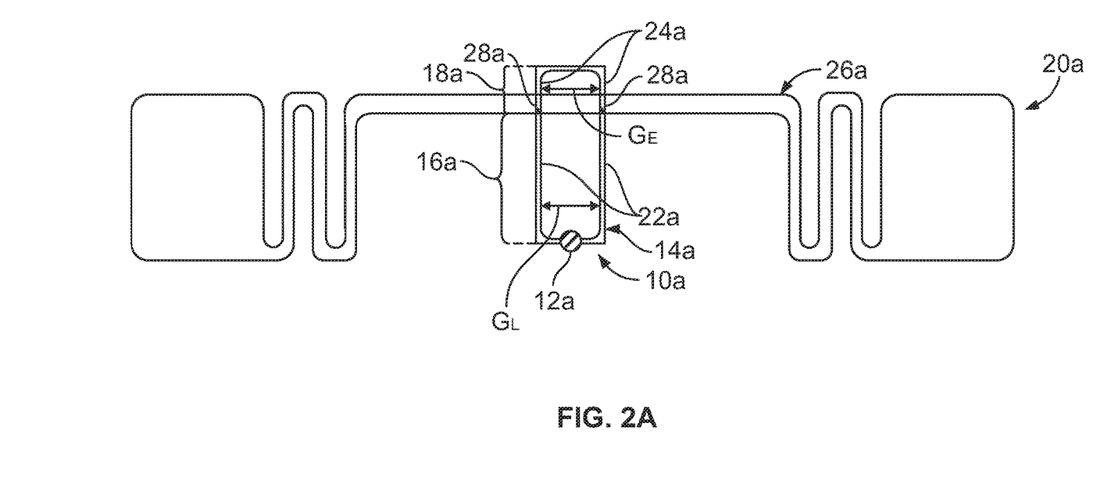
FIG. 2A is a top plan view of an embodiment of an RFID device according to an aspect of the present disclosure.

FIG. 2A illustrates an exemplary RFID device, generally designated at 20a, incorporating an RFID strap, generally designated at 10a, of the general type shown in FIG. 1. The strap conductor, generally designated at 14a, of the RFID strap 10a of FIG. 2A is differently shaped compared to the strap conductor 14 of the RFID strap 10 of FIG. 1; for example, strap conductor 14a is being generally rectangular instead of having a generally circular loop section 16 and a generally rectangular extension section 18 as in strap conductor 14, but is otherwise comparable to the strap conductor 14 of FIG. 1. In particular, the strap conductor 14a of FIG. 2A has a loop section 16a directly connected to the RFID chip 12a of the RFID strap 10a, with an extension section 18a of the strap conductor 14a being separated from the RFID chip 12a by the loop section 16a.

The loop section 16a and the extension section 18a each include a pair of legs 22a, 24a separated by a gap $G_L$, $G_E$ and extending in a direction between the RFID chip 12 and the antenna 26a (which is a generally vertical direction in the orientation of FIG. 2A). While the legs 22a of the loop section 16a and the legs 24a of the extension section 18a are separated by the same gap (i.e., $G_L=G_E$) in the embodiment of FIG. 2A (giving the strap conductor 14a its generally rectangular shape), it is within the scope of the present disclosure for the legs of each section to be separated by differently sized gaps, as will be discussed in greater detail in connection with the embodiment of FIG. 3A.

Figure 2B:
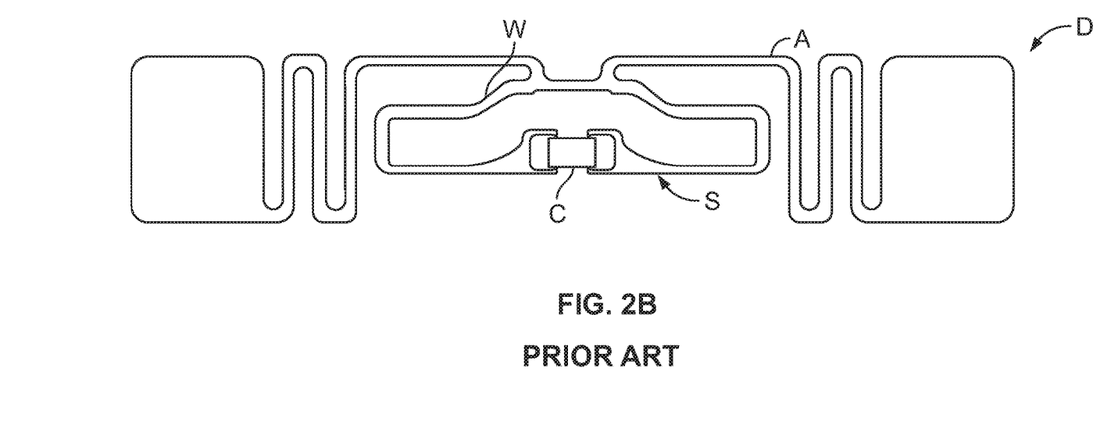
FIG. 2B is a top plan view of an RFID device according to conventional design.

The difference between the RFID device 20 of FIG. 2A and a conventional RFID device D may be understood and is illustrated by comparing FIG. 2A with FIG. 2B. The conventional RFID device D of FIG. 2B includes an antenna A that is coupled to an RFID strap S, which includes an RFID chip C and a strap conductor W. As can be seen, the conventional RFID device D of FIG. 2B has an RFID chip C that is coupled to the associated antenna A by an electric field due to the configuration of the strap conductor W of the RFID strap S, whereas the RFID chip 12a of FIG. 2A is coupled to the associated antenna, generally designated at 26a, by a combination of electric and magnetic fields, such being accomplished by the configuration, orientation, and positioning of its associated strap conductor 14a.

It should be understood that the RFID device 20a of FIG. 2A may include additional and/or differently configured components without departing from the scope of the present disclosure, which is also true for the other RFID devices described herein. For example, FIG. 2A does not illustrate a substrate to which the various components of the RFID device 20a may be secured. In another embodiment, the RFID strap 10a may be an encapsulated item designed to prevent the ingress of water and provide a robust structure. As for the antenna 26a, it may be variously configured without departing from the scope of the present disclosure. For example, in one embodiment, the antenna of an RFID device according to the present disclosure may be a flat structure, comprising a cut foil, a wire, or any other suitable material.

Figure 3A:
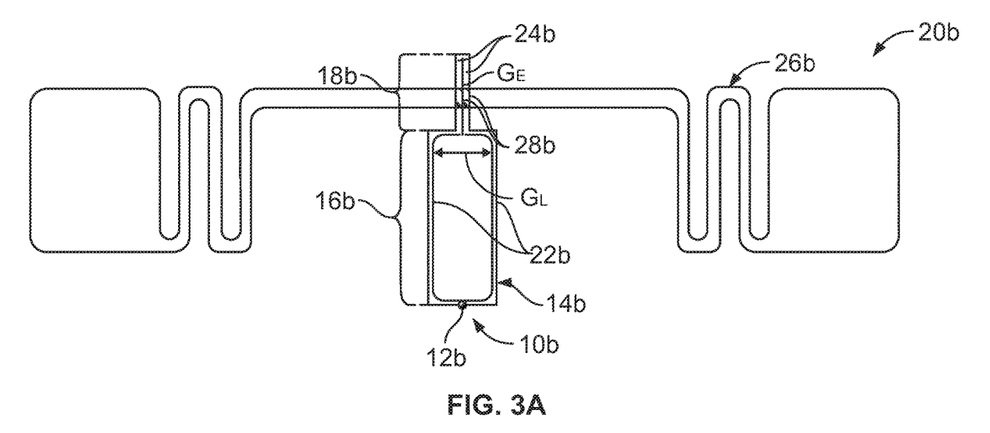
FIG. 3A is a top plan view of another embodiment of an RFID device according to an aspect of the present disclosure.

FIG. 3A illustrates a variation of the RFID device 20a of FIG. 2A. In the RFID device 20b of FIG. 3A, the strap conductor, generally designated at 14b, has a loop section 16b directly connected to the RFID chip 12b of the RFID strap 10b, with an extension section 18b of the strap conductor 14b being separated from the RFID chip 12b by the loop section 16b. The loop section 16b and the extension section 18b each include a pair of legs 22b, 24b separated by a gap $G_L$, $G_E$ and extending in a direction between the RFID chip 12b and the antenna 26b. In contrast to the embodiment of FIG. 2A, in which the size of the gaps $G_L$ and $G_E$ is substantially the same in both the loop section 16a and the extension section 18a, in FIG. 3A, the size of the gap or gaps $G_L$ in loop section 16b is different from the size of the gap or gaps $G_E$ in FIG. 3A of the loop section 1b. In particular, the size of the gap is greater between the legs 22b of the loop section 16b than between the legs 24b of the extension section 18b. In other embodiments, the size of the gaps may be greater between the legs of the extension section than between the legs of the loop section.

Thus, it will be seen that the principal difference between the RFID device 20a of FIG. 2A and the RFID device 20b of FIG. 3A is the configuration of the extension sections 18a and 18b of their respective strap conductors 14a and 14b. In particular, the size of the gap $G_E$ between the legs 24a of the extension section 18a of FIG. 2A is greater than the size of the gap $G_E$ between the legs 24b of the extension section 18b of FIG. 3A. As a result, there is a difference in the separation between the locations 28a and 28b at which the extension section 18a, 18b, respectively, overlaps and crosses the antenna 26a, 26b, respectively. Varying the separation between these respective locations 28a, 28b affects the impedance transformation between the RFID chip 12a, 12b and the antenna 26a, 26b, respectively, such that the separation between the locations 28a, 28b may be selectively varied when designing the RFID device 20a or 20b to satisfy the needs of the device.

Figure 3B:
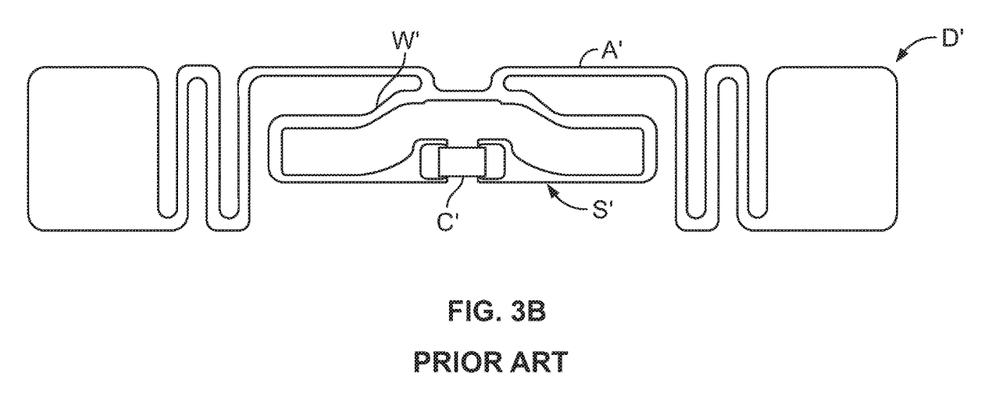
FIG. 3B is a top plan view of another RFID device according to conventional design.

As for the difference between the RFID device 20b of FIG. 3A and a conventional RFID device, it may be understood by comparing FIGS. 3A and 3B. The conventional RFID device D' of FIG. 3B includes an antenna A' that is coupled to an RFID strap S', which includes an RFID chip C' and a strap conductor W'. As can be seen, the conventional RFID device D' of FIG. 3B has an RFID chip C' that is coupled to the associated antenna A' by an electric field due to the configuration of the strap conductor W' of the RFID strap S', whereas the RFID chip 12b of FIG. 3A is coupled to the associated antenna 26b by a combination of electric and magnetic fields due to the configuration, orientation, and positioning of its associated strap conductor 14b according to the present disclosure.

As described above, the distance between the RFID chip and the associated antenna affects the coupling therebetween for RFID devices according to the present disclosure. This may be understood with reference to FIGS. 4A and 4B, which illustrate RFID devices, respectively designated as 20c and 20c', that are substantially identical (including the configuration of the RFID chip 12c, the size and shape of the strap conductor 14c, and the configuration of the antenna 26c), except for the relative position of the RFID strap 10c with respect to the antenna 26c. Compared to the embodiment of FIG. 4A, in the embodiment of FIG. 4B, the RFID chip 12c is closer to the antenna 26c. Stated differently, the portion of the strap conductor 14c on the same side of the antenna 26c as the RFID chip 12c (i.e., the loop section 16c) is smaller in FIG. 4B than in FIG. 4A. This difference in the relative positions of the RFID strap 10c and the antenna 26c affects the resonant frequency of the loop section 16c of the strap conductor 14c.

Figure 4A:
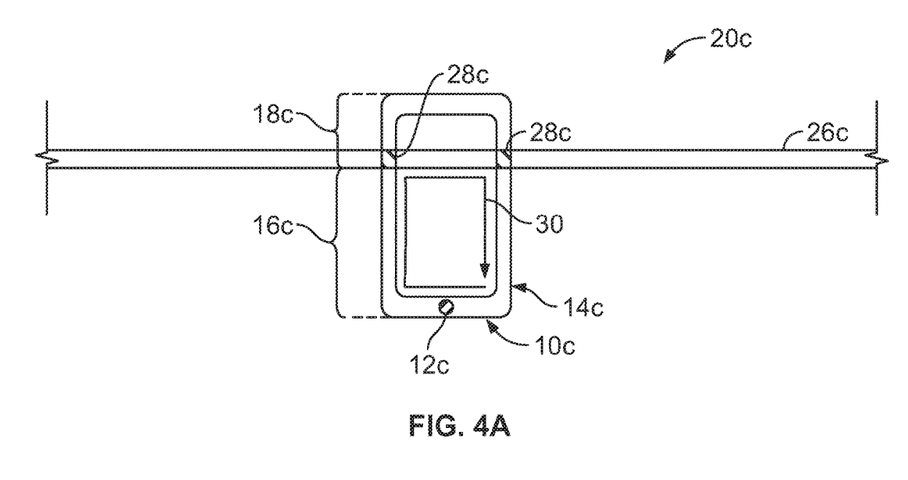
FIGS. 4A and 4B are top plan views of a portion of an RFID device according to an aspect of the present disclosure, illustrating an exemplary approach to vary one or more of the properties of the RFID device by varying its configuration.
Figure 4B:
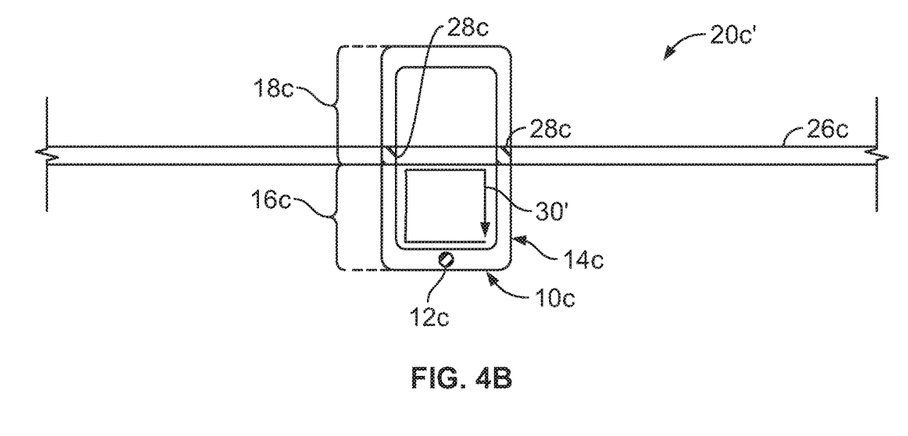

In particular, the two locations 28c at which the extension section 18c overlaps and crosses the antenna 26c causes a section of the strap conductor 14c to be bypassed by the antenna conductor, depending on the value of the capacitors, which will change the effective perimeter 30, 30' of the loop section 16c and, hence, its tuned frequency. The relative positioning of the two locations 28c' along the strap conductor 14c of FIG. 4B is not the same as the relative positioning of the two locations 28 along the strap conductor 14c of FIG. 2A. Thus, the tuned frequencies of the RFID devices 20c and 20c' of FIGS. 4A and 4B will be different, with the frequency of the RFID device 20c' of FIG. 4B being higher than the frequency of the RFID device 20c of FIG. 4A due to its smaller loop section perimeter 30' of FIG. 4B when compared with the corresponding loop section perimeter 30 of FIG. 4A. This variable frequency allows for a standard RFID strap to be adapted to different antennae and device requirements by adjusting the relative positions of the RFID strap and antenna.

Figure 5:
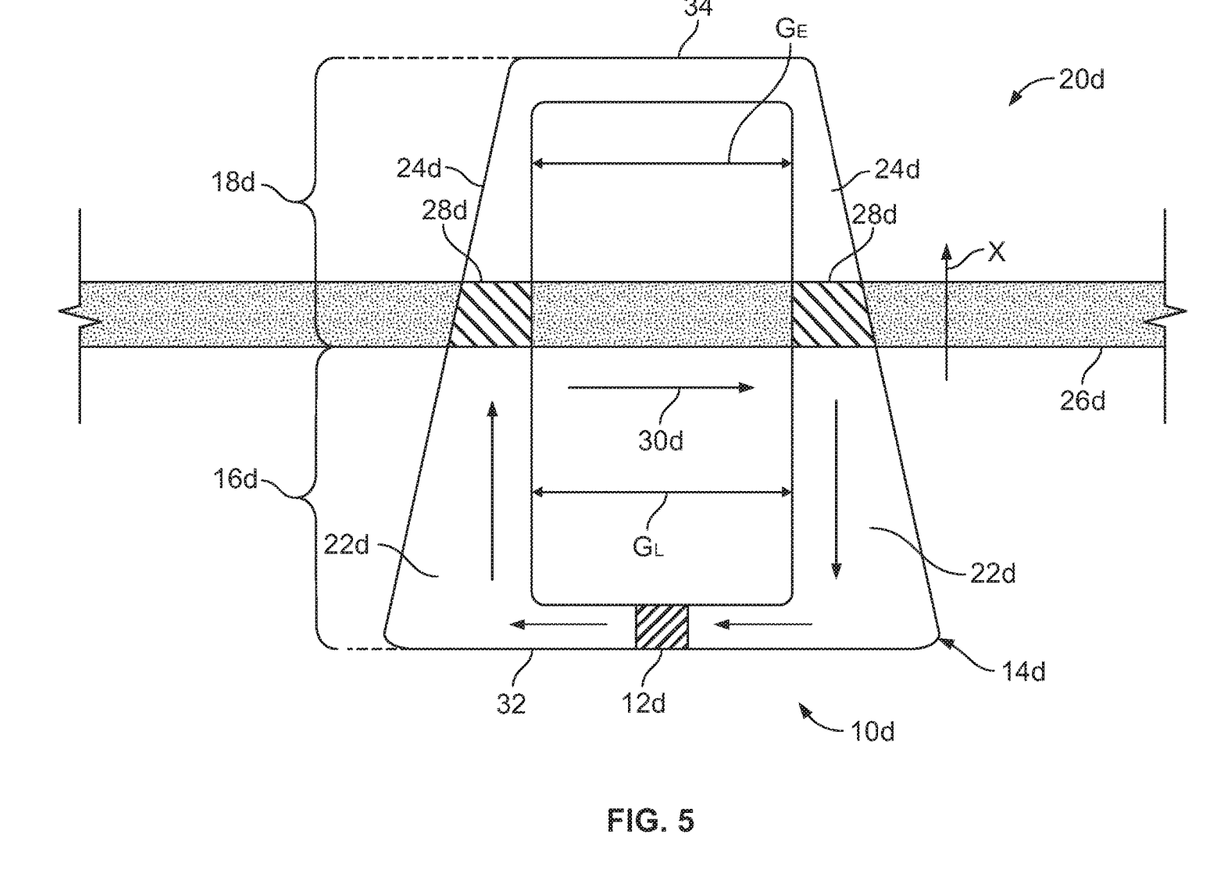
FIG. 5 is a top plan view of a portion of an RFID device embodying an approach to compensating for the relative position of the RFID strap of the device with respect to the associated antenna.

While it may be advantageous to adjust the position of the RFID strap with respect to the antenna, if the change in position is the result of manufacturing tolerances, then the change in loop frequency may be undesirable. FIG. 5 illustrates an RFID device, generally designated at 20d, that is configured to compensate for the relative position of the strap conductor, generally designated at 14d, of the RFID strap 10d with respect to the antenna 26d. In particular, the RFID device 20d of FIG. 5 includes a strap conductor 14d having a loop section 16d directly connected to the RFID chip 12d, with an extension section 18d of the strap conductor 14d being separated from the RFID chip 12d by the loop section 16d. The loop section 16d and the extension section 18d each include a pair of legs 22d, 24d separated by a gap $G_L$, $G_E$ and extending in a direction between the RFID chip 12d and the antenna 26d. In the embodiment of FIG. 5, the size of the gaps $G_L$ and $G_E$ is the same in both the loop section 16d and the extension section 18d, but the gap size may differ without departing from the scope of the present disclosure.

The width of at least one of the legs 22d, 24d (and, in some embodiments, of each leg 22d, 24d) of the strap conductor 14d of FIG. 5 varies, rather than being uniform. In particular, the width of each leg 22d, 24d in the embodiment illustrated in FIG. 5, tapers from a maximum width at the end 32 of the RFID strap 10d adjacent to the RFID chip 12d to a minimum width at the opposite end 34. By such a configuration, the width of each leg 22d, 24d is greater adjacent to the RFID chip 12d than adjacent to the antenna 26d. In other embodiments, the width of one or both legs 22d, 24d may taper from a minimum width at the end 32 of the RFID strap 10d adjacent to the RFID chip 12d to a maximum width at the opposite end 34. Additionally, while FIG. 5 illustrates legs 22d and 24d that are substantially identical mirror images, it is within the scope of the present disclosure for the legs 22d and 24d to be differently configured from each other and/or as illustrated in FIG. 5.

Due to the varying width of the legs 22d and 24d of the strap conductor 14d that are illustrated in FIG. 5, the degree of overlap at the locations 28d where the strap conductor 14d crosses the antenna 26d depends upon the relative positions of the RFID strap 10d and the antenna 26d. For example, if the strap conductor 14d is positioned with the RFID chip 12d relatively close to the antenna 26d, then there will be a greater degree of overlap due to the relatively large width of the legs 22d and 24d closer to the RFID chip 12d. Conversely, if the strap conductor 14d is positioned with the RFID chip 12d spaced farther from the antenna 26d, then there will be a lesser degree of overlap due to the relatively small width of the legs 22d and 24d farther from the RFID chip 12d.

The capacitance between the legs 22d and 24d and the antenna 26d is proportional to the coupling area, meaning that the shape of the legs 22d and 24d can assist in stabilizing the frequency in the event of deviations from the intended position of the RFID strap 10d with respect to the antenna 26d. In particular, as the RFID strap 10d is moved to position the RFID chip 12d closer to the antenna 26d, inductance decreases (due to the decreased length of the perimeter 30d of the loop section 16d), while capacitance increases (due to the greater degree of overlap between the extension section 18d of the strap conductor 14d and the antenna 26d at the intersection locations 28d). Depending on the values of inductance, capacitance, and RFID chip capacitance, the product of inductance and capacitance (which controls the resonant frequency) may be compensated for in order to be relatively stable regardless of the proximity of the RFID chip 12d to the antenna 26d, thereby compensating for positional tolerance in applying the RFID strap 10d to the antenna 26d.

Figure 6A:
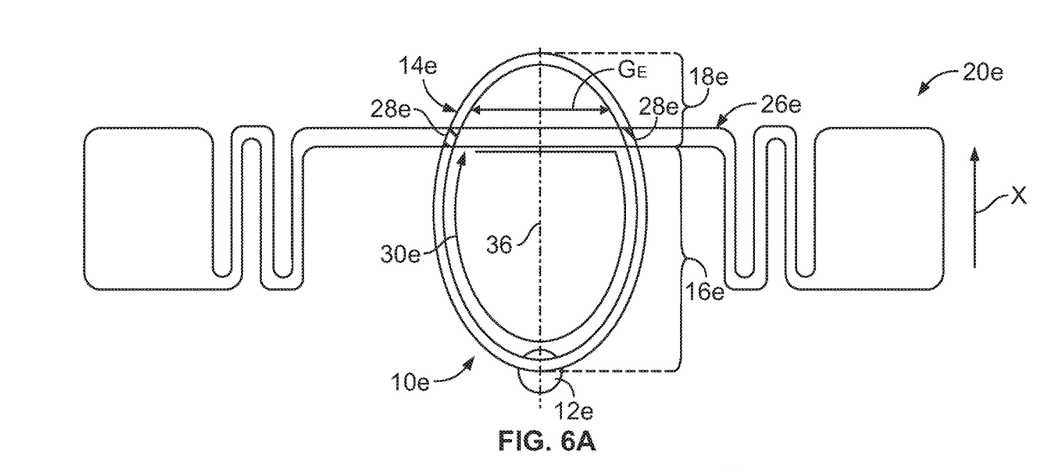
FIGS. 6A and 6B are top plan views of an RFID device with an RFID strap having a complex shape according to an aspect of the present disclosure, illustrating an exemplary approach to vary one or more of the properties of the RFID device by varying its configuration.
Figure 6B:
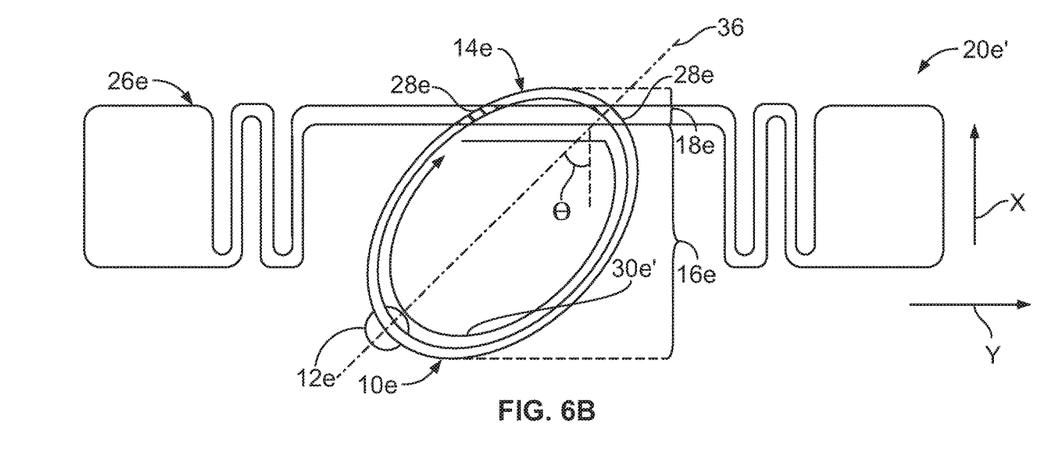

FIGS. 6A and 6B illustrate embodiments of RFID devices 20e and 20e' according to the present disclosure incorporating a strap conductor 10e with a complex shape. The RFID devices 20e and 20e' of FIGS. 6A and 6B are comparable to the RFID devices of FIGS. 2A, 3A, and 4A-5, with an antenna 26e and an RFID strap 10e including an RFID chip 12e coupled to the antenna 26e by a strap conductor 14e comprised of a loop section 16e and an extension section 18e. The principal difference is that the strap conductor 14e of FIGS. 6A and 6B has a generally elliptical shape. As a result, adjusting the relative positions of the RFID strap 10e and antenna 26e in the illustrated "x" direction not only changes the length of the perimeter 30e, 30e' of the loop section 16e (as in the other embodiments), but also changes the distance between the locations 28e at which the extension section 18e overlaps and crosses the antenna 26e due to the variable-width gap $G_E$ of the extension section 18e. Other complex shapes besides an ellipse may also be employed without departing from the scope of the present disclosure.

FIGS. 6A and 6B also illustrate a manner in which the impedance transformation between the RFID chip 12e and the antenna 26e may be adjusted by varying the angular orientation of the RFID strap 10e with respect to the antenna 26e. The strap conductor 14e may be understood as having a center line 36 extending in a direction between the RFID chip 12e and the antenna 26e, which is shown in FIG. 6A as a vertical line extending in the "x" direction. In the orientation of FIG. 6A, the center line 36 is substantially perpendicular to the antenna 26e at the location where the center line 36 crosses the antenna 26e. This orientation of the RFID strap 10e with respect to the antenna 26e may be considered as representing an angular orientation of zero. FIG. 6B shows the RFID strap 10e with a non-zero angular orientation, with the RFID strap 10e being rotated some angle Θ about the center of the strap conductor 14e, such that the center line 36 crosses the antenna 26e at a non-perpendicular angle Θ and at a different position (illustrated as a horizontal offset in the "y" direction in FIG. 6B). Other angular orientations may also be employed without departing from the scope of the present disclosure, and it should also be understood that varying the angular orientation of the RFID strap is not limited to the embodiment of FIGS. 6A and 6B, but may be employed with any of the RFID devices according to the present disclosure.

By adjusting the angular orientation of the RFID strap 10e, the space between the locations 28e at which the extension section 18e of the strap conductor 14e crosses the antenna 26e may be varied. Adjusting the angular orientation also varies the length of the perimeter 30e, 30e' of the loop section 16e, while varying the position of the RFID chip 12e with respect to the antenna 26e in both the "x" and "y" directions (FIG. 6B). Changing any one of these factors (along with the size and/or shape of the strap conductor) will vary the impedance transformation between the RFID chip 12e and the antenna 26e, allowing for a better match between the RFID chip 12e and the antenna 26e.

It will be understood that the embodiments described above are illustrative of some of the applications of the principles of the present subject matter. Numerous modifications may be made by those skilled in the art without departing from the spirit and scope of the claimed subject matter, including those combinations of features that are individually disclosed or claimed herein. For these reasons, the scope hereof is not limited to the above description but is as set forth in the following claims, and it is understood that claims may be directed to the features hereof including as combinations of features that are individually disclosed or claimed herein.

The invention claimed is:

1. An RFID device, comprising:
   an antenna;
   an RFID strap, including a chip attached to the strap, the strap is coupled to the antenna by a combination of magnetic and electric fields; and
   the strap comprises a strap conductor that includes a loop and an extension, the extension overlapping and crossing the antenna and the strap conductor has a center line extending generally in a direction between the RFID chip and the antenna;
   where the RFID strap is encapsulated to provide a robust structure.

2. The RFID device of claim 1, wherein the loop section is positioned generally adjacent to the antenna.

3. The RFID device of claim 1, wherein the loop section is generally circular and the extension section is generally rectangular.

4. The RFID device of claim 1, wherein the strap conductor is generally rectangular.

5. The RFID device of claim 1, wherein
   the loop section and the extension section each include legs separated by a gap and extending in a direction between the RFID chip and the antenna, and
   the size of the gap between the legs of the loop section is different from the size of the gap between the legs of the extension section.

6. The RFID device of claim 5, wherein the size of the gap between the legs of the loop section is greater than the size of the gap between the legs of the extension section.

7. The RFID device of claim 1, wherein the strap conductor has a generally elliptical shape.

8. The RFID device of claim 1, wherein
   the extension section includes a leg extending in a direction between the RFID chip and the antenna, and
   a width of the leg varies.

9. The RFID device of claim 8, wherein
   the extension section includes a second leg extending in a direction between the RFID chip and the antenna, and
   the width of each of the legs varies.

10. The RFID device of claim 8, wherein the width of each leg tapers from a maximum width at an end of the RFID strap to the RFID chip to a minimum width at an opposite end such that the width of each leg is greater adjacent to the RFID chip than adjacent to the antenna.

11. The RFID device of claim 1, wherein
    the center line is substantially perpendicular to the antenna at a location where the center line crosses the antenna.

12. The RFID device of claim 1, wherein
    the center line crosses the antenna at a non-perpendicular angle.

13. A method of coupling an RFID strap of an RFID device to an antenna of the RFID device, comprising:
    coupling the RFID strap to the antenna by a magnetic field and the RFID strap includes an RFID chip; and
    coupling the RFID strap to the antenna by an electric field such that the RFID strap comprises a strap conductor that includes a loop and an extension such that the loop section is positioned generally adjacent to the antenna and the strap conductor has a center line extending generally in a direction between a RFID chip and the antenna.

14. The method of claim 13, further comprising adjusting an impedance transformation between the RFID chip and the antenna by varying a size of the RFID strap, a configuration of the RFID strap, and/or an angular orientation of the RFID strap with respect to the antenna.

15. The method of claim 13 further comprising adjusting a tuned loop frequency of the loop section by adjusting an effective perimeter of the loop section.

16. The method of claim 13, wherein said coupling the RFID strap to the antenna by the electric field includes overlapping and crossing the antenna with the extension section of the RFID strap.

17. The method of claim 16, wherein
    the RFID strap overlaps the antenna at two locations, and further comprising adjusting an impedance transformation between the RFID chip and the antenna by varying a distance between the two locations.

18. The method of claim 16, wherein
    the extension section includes a leg extending in a direction between the RFID chip and the antenna, and
    a width of the leg varies, and further comprising adjusting the strength of the electric field by adjusting the position of the leg with respect to the antenna.

* * * * *